United States Patent [19]

Rai et al.

[11] Patent Number: 4,907,206
[45] Date of Patent: Mar. 6, 1990

[54] METHOD FOR ESTIMATING FORMATION LITHOLOGY

[75] Inventors: Chandra S. Rai; Kenneth E. Hanson, both of Tulsa, Okla.

[73] Assignee: Amoco Corporation, Chicago, Ill.

[21] Appl. No.: 226,354

[22] Filed: Jul. 29, 1988

[51] Int. Cl.$^4$ .............................................. G01V 1/34
[52] U.S. Cl. ...................................................... 367/68
[58] Field of Search ................... 367/37, 47, 75, 59, 367/68, 72

[56] References Cited

U.S. PATENT DOCUMENTS

| | | | |
|---|---|---|---|
| 3,949,352 | 4/1976 | Vogel | 367/75 |
| 4,554,649 | 11/1985 | Herkenhoff et al. | 367/68 |
| 4,692,910 | 9/1987 | Soundergeld et al. | 367/75 |
| 4,713,968 | 12/1987 | Yale | 73/594 |
| 4,789,969 | 12/1988 | Naville | 367/36 |
| 4,794,572 | 12/1988 | Sondergeld et al. | 367/31 |

OTHER PUBLICATIONS

McCormack et al., "A Case Study of Stratigraphic Intrepretatia using Shear & Compressional Seismic Data," Geophysics, vol. 49, #5.
Domenico, S. N., "Rock Lithologly and Porosity Determination from Shear & Compressional Wave Velocity," Geophysics, vol. 49, #8, 8/84.
K. Helbig, "Systematic Classification of Layer—Induced Transverse Isotropy", Geophysical Prospecting, vol. 29, (1981), pp. 550-577.
L. Y. Brodov et al., "Some Results of the Experimental Study of Seismic Anisotropy of Sedimentary Rocks Using Different Types of Waves", Geophys. J. R. Astr. Society, vol. 76, (1984), pp. 191-200.
Chandra S. Rai and Kenneth E. Hanson, "Shear—Wave Velocity Anisotropy in Sedimentary Rocks: A Laboratory Study", Geophysics, vol. 53, No. 6, (Jun. 1988), pp. 800-806.

Primary Examiner—Thomas H. Tarcza
Assistant Examiner—Ian J. Lobo
Attorney, Agent, or Firm—Timothy D. Stanley

[57] ABSTRACT

A novel method of geophysical exploration is described for obtaining estimates the formation lithology from measures of formation anisotropy. First and second measures of formation anisotropy can be transformed into estimates of formation lithology by crossplotting them onto a lithology diagram. In one embodiment of the present invention, the lithology diagram comprises two separate axes representing measures of formation azimuthal anisotropy and transverse isotropy for a selected formation property which defines regions of separate lithologies. The lithology diagram can provide a novel means for discriminating formation lithology from the measures of formation anisotropy.

13 Claims, 4 Drawing Sheets

METHOD FOR ESTIMATING FORMATION LITHOLOGY

BACKGROUND OF THE INVENTION

The present invention relates generally to a method of geophysical exploration and more particularly to a method for estimating formation lithology employing measures of formation anisotropy.

In the continuing search for oil and gas, it is oftentimes useful to be able to estimate formation lithology since formation lithology can be a guide to the location of oil- and gas-bearing formations. Generally, formation lithology can be characterized as carbonate, sandstone, shale or combinations thereof. Various methods for obtaining estimates of subsurface formation lithology have been proposed. By way of example, Sondergeld, et al., in U.S. Pat. No. 4,692,910, describe a method whereby seismic wave velocities of propagation in subsurface formations can be used to obtain estimates of formation lithologies. Additionally, U.S. Pat. No. 4,554,649 Herkenhoff et al., describe methods for obtaining estimates of subsurface formation lithologies whereby range dependent amplitude variations of events recorded in seismic signals can be employed to provide estimates of subsurface formation lithologies.

More recently, exploration geophysicists have noted that certain subsurface formations can exhibit velocity anisotropy. For example, see the discussions by K. Helbig "Systematic Classification of Layer-Induced Transverse Isotropy," Geophysical Prospecting Volume 29 (1981), page 550–577, and L. Y. Brodov, et al., "Some Results of the Experimental Study of Seismic Anisotropy of Sedimentary Rocks Using Different Types of Waves," Geophysics J. R. Astronomy Society, Volume 76 (1984), page 191–200, as well as the following commonly assigned applications: Alford in U.S. Pat. Application No. 633,160, or Alford, et al., in U.S. Application Pat. No. 633,163; additionally, Sondergeld, et al. in U.S. Pat. Application No. 913,210 and Sondergeld, et al. in U.S. Pat. Application No. 108,847.

In spite of the advances in seismic exploration as well as the desirability of estimating formation lithology, geophysicists have failed to develop techniques for estimating formation lithology from measures of formation anisotropy.

SUMMARY OF THE INVENTION

The present invention relates to a method for estimating formation lithology, and more particularly, to a method for estimating formation lithology from measures of formation anisotropy.

An important objective of geophysical exploration is to obtain estimates of formation lithology. Unlike prior attempts to obtain such estimates of formation lithology, the present invention embarks upon an approach employing recently developed information about the earth's anisotropic character. The present invention provides a novel method for estimating formation lithology from measures of formation anisotropy.

In one embodiment of the present invention, a lithology diagram is developed having first and second axes each representative of a separate measure of formation anisotropy for a selected formation property. The lithology diagram includes regions defining a relationship between the measures of formation anisotropy and formation lithology. The separate measures of formation anisotropy can include measures of the extent of formation azimuthal anisotropy and transverse isotropy for a selected formation property. Separate measures of formation anisotropy for a selected formation property can be obtained and crossplotted onto the lithology diagram to yield estimates of formation lithology. The measures of formation anisotropy for a selected formation property can be obtained either from field acquired geophysical data or laboratory measured properties. In one embodiment of the invention, the selected formation property is the velocity of propagation of seismic energy. These and other features and advantages of the present invention will be better understood from the drawings and the following detailed description and appended claims.

DETAILED DESCRIPTION OF THE INVENTION

The present invention relates generally to a method of geophysical exploration, and more particularly, to a method for estimating formation lithology from measures of formation anisotropy.

In order to better understand the present invention, the following brief introductory comments are provided. Anisotropy is a characteristic of materials to exhibit physical formation properties which can vary with direction. Velocity anisotropy in earth formations can be evidenced by differences in the velocities of propagation of seismic energy, of a particular wave type, along different directions therein. Velocity anisotropy in earth formations can be related to such things as stress induced fractures, aligned cracks or microfissures, mineralogy, deposition history, etc. Although the following discussion focuses on velocity anisotropy in earth formations, geophysicists will appreciate that velocity anisotropy is merely an exemplar of one physical property of earth formations which can be anisotropic and from which estimates of formation lithology can be obtained. In fact, the present invention is intended to encompass all physical properties of the earth's formation which exhibit anisotropy and from which estimates of formation lithology can be obtained.

Figure 1:
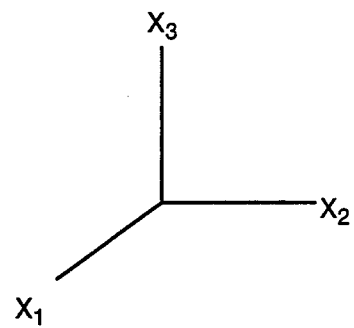
FIG. 1 is a representation of a transversely isotropic formation having horizontally aligned layers.
Figure 1:
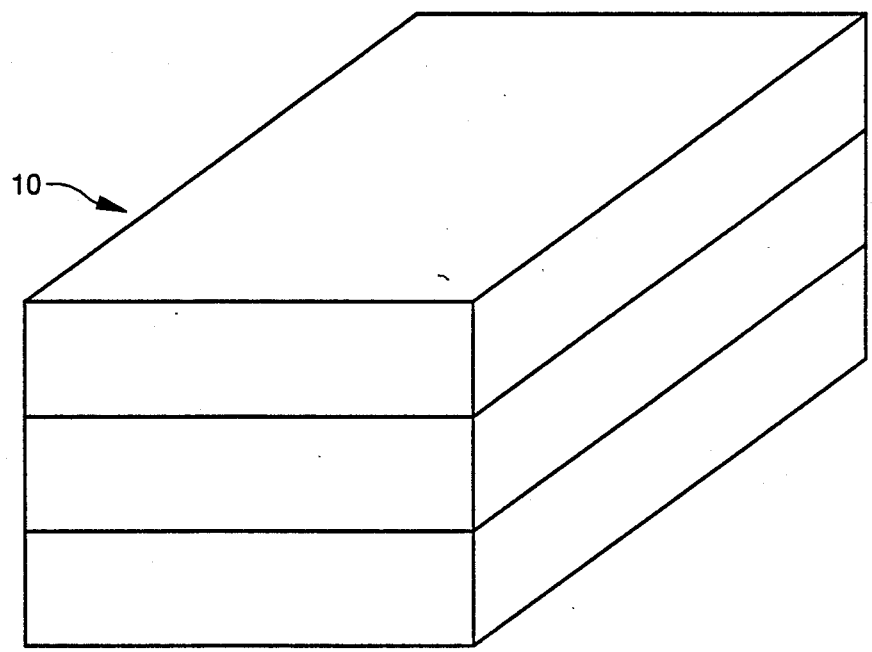

Anisotropy in earth formations can take on various forms. By way of example and with reference to FIG. 1, a simple horizontally layered formation 10 is depicted with reference to a three axis coordinate system (e.g., $X_1$, $X_2$, $X_3$) adjacent thereto. When the velocities of propagation of seismic energy, of a given wave type (i.e., shear wave or compressional wave), along the $X_1$ and $X_2$ axes in the formation 10 are the same and the velocity of propagation along the $X_3$ axis is different, the formation 10 is referred to as being transversely isotropic. That is, the differences in the velocities of propagation of the seismic energy depend on the angle between the direction of propagation and the vertical axis of symmetry (i.e., $X_3$ axis).

Transversely isotropic formations are generally the result of preferred mineral grain orientations and/or deposition history. Laboratory findings indicate that transversely isotropic formations can be strongly correlated with formation clay content. Thus formation lithologies high in clay content (i.e., shales) exhibit a high degree of transverse isotropy and lithologies low in clay content (i.e., carbonates) exhibit a low degree of correlation with transverse isotropy. Sandstone lithologies exhibit an intermediate correlation to transverse isotropy.

Figure 2:
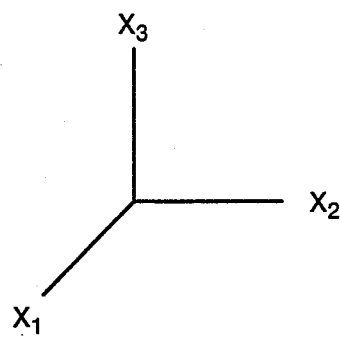
FIG. 2 is a representation of an azimuthally anisotropic formation having vertically aligned layers.
Figure 2:
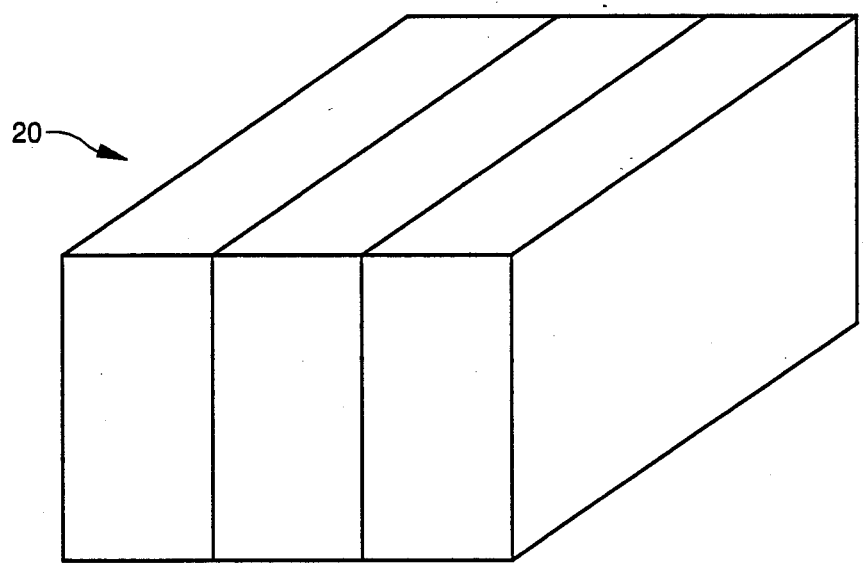

Referring now to FIG. 2, a simple vertically layered formation 20 is depicted with reference to a three axis coordinate system (e.g., $X_1$, $X_2$, $X_3$) adjacent thereto. When the velocities of propagation of seismic energy, of a given wave type, along the horizontal $X_1$ and $X_2$ axes in the formation 20 are different, the formation 20 is referred to as being azimuthally anisotropic. That is, differences in velocities of propagation of the seismic energy depend upon the azimuthal direction of propagation.

Azimuthally anisotropic formations are generally the result of preferentially aligned cracks and microfissures. In fact, azimuthal anisotropy can be induced in a rock sample by the application of anisotropic stresses. The extent of azimuthal anisotropy at a given stress can be related to formation lithology. In particular, laboratory findings indicate that sandstone formations exhibit a high degree of correlation with azimuthal anisotropy, shale formations a low correlation and carbonate formations intermediate values for a given stress.

In order to assess the extent to which earth formations are transversely and/or azimuthally anisotropic, the following scheme has been developed. The extent of formation anisotropy can be defined as a percentage of the difference between the largest measure of a formation property L along a given axis and the smallest measure of the selected formation property S along another axis, as set forth in Eq. 1 below:

$$\% \text{ anisotropy} = [L_1 - S_2/L_1] \, 100 \quad (1)$$

where $L_1$ = the largest measure of the formation property along axis 1 of the formation and
S = the smallest measure of the formation property along axis 2 of the formation.

With reference to FIG. 2, one can express the extent of velocity azimuthal anisotropy as follows:

$$\% \text{ velocity azimuthal anisotropy} = [V_{x1} - V_{x2}/V_{x1}] \, 100 \quad (2)$$

where $V_{x1}$ = velocity along the $X_1$ axis,
$V_{x2}$ = velocity along the $X_2$ axis, and $V_{x1} > V_{x2}$.
Similarly with reference to FIG. 1, the extent of velocity transverse isotropy can be expressed as follows:

$$\% \text{ velocity transverse isotropy} = [V_{x1} - V_{x3}/V_{x1}] \, 100 \quad (3)$$

where $V_{x3}$ = velocity along the $X_3$ axis,
$V_{x1}$ = velocity along the $X_1$ axis, and $V_{x1} > V_{x3}$.
After carefully studying various formation lithologies and their relationships with formation anisotropy, we have found that one can discriminate formations lithology by obtaining measures of the extent of formation azimuthal anisotropy and transverse isotropy for selected formation properties. In particular and with reference to FIG. 3, we have found that a lithology diagram A can be constructed having first and second axes, each providing a separate measure of formation anisotropy, and having regions defining relationships between formation anisotropy and formation lithology so as to discriminate between the formation lithologies of shale, sandstone, and carbonates and thus provide estimates of formation lithology from measures of formation anisotropy.

Figure 3:
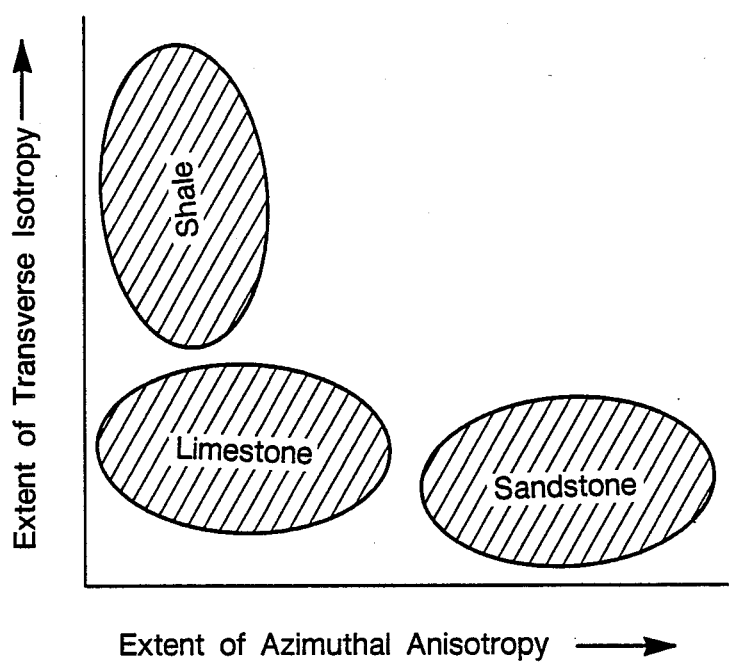
FIG. 3 is a representation of a lithology diagram for estimating formation lithology from measures of formation anisotropy.

Geophysicists will appreciate that each of the regions defining a relationship between formation anisotropy and formation lithology (e.g., shale, sandstone, carbonates) are not mutually exclusive; but rather, the regions of the various lithologies tend to overlap to some extent, due in part to their deposition history. As such, the lithology diagram A of FIG. 3 is intended to be representative of the relationships between formation lithology and formation anisotropy and not exact. By obtaining measures of formation azimuthal anisotropy and transverse isotropy for a selected formation property and cross plotting such measures on the lithology diagram A, one can discriminate among the formation lithologies of shale, sandstone, and carbonates and thus obtain estimates of formation lithology.

Figure 4:
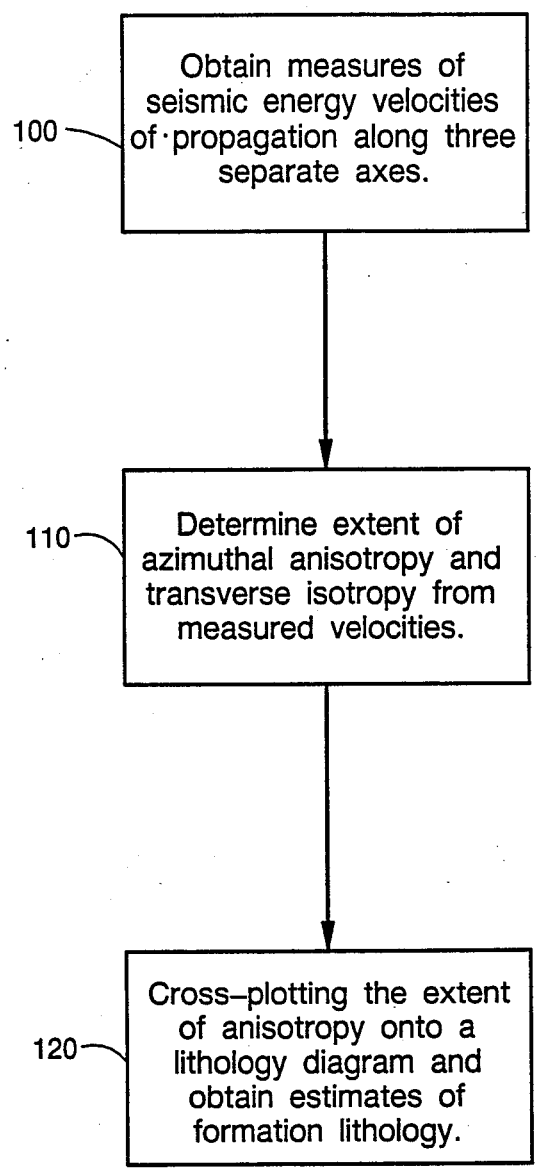
FIG. 4 is a flow diagram of the present invention.

Looking now to FIG. 4, one method of obtaining estimates of formation lithology from measures of formation anisotropy will be described. At step 100, separate measures of seismic energy velocities of propagation (for a given wave type) in selected formations are obtained along three linearly independent axes. Preferably, such axes are mutually orthogonal. The measures of seismic energy velocities of propagation along separate axes can be obtained in the field employing techniques described in commonly assigned U.S. Pat. Application Nos. 633,160, 633,163, 925,756, and 913,210. When employing such techniques, one can first obtain a measure of formation velocity azimuthal anisotropy from near offset gathers of seismic signals and then process the far offset gathers of seismic signals to obtain a measure of formation velocity transverse isotropy. Additionally, commonly owned U.S. Pat. Application No. 108,847 describes a laboratory method for obtaining separate measures of formation velocities of propagation all of which are incorporated by reference herein.

At step 110, measures of the extent of formation velocity azimuthal anisotropy and formation velocity transverse isotropy are obtained according to Equations (2) and (3), respectively, from the velocities obtained at 100. At step 120, the measures of the extent of formation anisotropy from step 110 are cross-plotted on a lithology diagram similar to that shown in FIG. 3 so as to discriminate amongst formation lithologies and yield estimates of formation lithology.

Having described a preferred embodiment of the present invention, those skilled in the art will appreciate that modifications and variations thereto can be made without departing from the concept of present invention. Accordingly, it is to be clearly understood that the embodiment described and depicted herein is illustrative only and the scope of the present invention is to be limited only by the claims presented.

We claim:
1. A method for estimating formation lithology, comprising the steps of:
(a) obtaining measures of a selected formation property along three separate axes of a formation;
(b) obtaining a first measure of extent of formation anisotropy from a measure of the difference between the formation property measurement along a first pair of formation axes;

(c) obtaining a second measure of extent of formation anisotropy from a measure of the difference between the formation property measured along a second pair of formation axes;

(d) obtaining an estimate of formation lithology from the first and second measures of extent of formation anisotropy.

2. The method of claim 1, wherein the first measure of the extent of formation anisotropy comprises a measure of the extent of transverse isotropy for the selected formation property.

3. The method of claim 1, wherein the second measure of the extent of formation anisotropy comprises a measure of the extent of azimuthal anisotropy for the selected formation property.

4. The method of claim 1, wherein the first measure of the extent of formation anisotropy includes a measure of the extent of transverse isotropy for a selected formation property according to:

% transverse isotropy $= [L_{x1} - S_{x3}/L_{x1}]\ 100$ where $L_{x1}$ = the largest measure of the selected formation property along a first axis x1 of the formation,
$S_{x3}$ = the smallest measure of the selected formation property along a second axis x3 of the formation, and
x1, x3, are orthogonal axes of the formation.

5. The method of claim 1, wherein the second measure of the extent of formation anistropy includes a measure of the extent of azimuthal anisotropy for a selected formation property according to:

% azimuthal anisotropy $= [L_{x1} - L_{x2}/L_{x1}]\ 100$ where $L_{x1}$ = the largest measure of the selected formation property along a first axis $x_1$ of the formation,
$S_x$ = the smallest measure of the selected formation property along a second axis $x_2$ of the formation, and
$x_1$, $x_2$, are orthogonal axis of the formation.

6. The method of claim 1, wherein the selected formation property comprises seismic wave velocity of propagation.

7. The method of claim 1, wherein the measure of the extent of formation velocity transverse isotropy is determined according to:

% velocity transverse isotropy $= [V_{x1} - V_{x3}/V_{x1}]\ 100$ where $V_{x1}$ = the fastest velocity along a first axis x1 of the formation, $V_{x3}$ = the slowest velocity along a second axis x3 of the formation, and
x1, x3 are axes of the formation.

8. The method of claim 6, wherein the measure of the extent of formation velocity azimuthal anisotropy is determined according to:

% velocity azimuthal isotropy $= [V_{x1} - V_{x2}/V_{x1}]\ 100$ where $V_{x1}$ = the fastest velocity along a first axis x1 of the formation,
$V_{x2}$ = the slowest velocity along a second axis x2 of the formation, and
x1,x2 are axes of the formation.

9. The method of claim 1, wherein the estimate of formation lithology is obtained by crossplotting the first and second measures of the extent of formation anisotropy on a lithology diagram.

10. A method for estimating formation lithology, comprising the steps of:
(a) obtaining measures of a selected formation property along three separate directions in the formation;
(b) obtaining a measure of the extent of formation anisotropy from a measure of the difference between the measured formation property along a first pair of directions in the formation;
(c) obtaining a measure of the extent of formation anisotropy from a measure of the difference between the measured formation property along a second pair of directions in the formation; and
(d) crossplotting the measures of the extent of formation anisotropy along first and second axes on a lithology diagram so as to obtain an estimate of formation lithology.

11. A method for constructing a lithology diagram, having first and second axes, wherein the lithology diagram can be employed for converting first and second measures of extent of formation anisotropy into estimates of formation lithology, comprising:
(a) assigning a first measure of extent of formation anisotropy of a selected formation property to the first axis, wherein the first measure of extent of formation anisotropy comprises a measure of the difference between the formation property along a first pair of directions in the formation;
(b) assigning a second measure of extent of formation anisotropy of the selected formation property to the second axis, wherein the second measure of extent of formation anisotropy comprises a measure of the difference between the formation property along a second pair of directions in the formation and the first and second axes include a range of measures to the extent of formation anisotropy for the selected formation property; and
(c) defining regions on the lithology diagram, wherein each region, encompasses a selected range of the first and second measures of extent of formation anisotropy so as to define relationships between the measures of the extent of formation anisotropy in selected formation property and formation lithology.

12. The method of claim 11 wherein the first axis represents a measure of the extent of formation transverse isotropy of the selected formation property and the second axis represents a measure of the extent of formation azimuthal anisotropy of the selected formation property.

13. The method of claim 11, wherein the selected formation property includes seismic wave velocity propagation.

* * * * *